United States Patent [19]

Lee

[11] Patent Number: 5,207,722
[45] Date of Patent: May 4, 1993

[54] PARTITION FOR AIR-CONDITIONED VEHICLE

[76] Inventor: Ling H. Lee, 6496 Heather Dr., Memphis, Tenn. 38119

[21] Appl. No.: 928,714

[22] Filed: Aug. 13, 1992

[51] Int. Cl.$^5$ .......................................... B62D 33/04
[52] U.S. Cl. ................................................ 296/24.1
[58] Field of Search ........................ 296/24.1, 180.1

[56] References Cited

U.S. PATENT DOCUMENTS

| | | | |
|---|---|---|---|
| 3,931,994 | 1/1976 | Palmiter | 296/24.1 |
| 4,366,977 | 1/1983 | Davis et al. | 296/24.1 |
| 4,621,856 | 11/1986 | McKenzie | 296/24.1 |
| 4,938,518 | 7/1990 | Willemsen | 296/24.1 |

Primary Examiner—Robert R. Song

[57] ABSTRACT

For the purpose of achieving more efficient control of the interior temperature of front half of a passenger vehicle, this invention discloses an attachable and detachable transparent partition mounted on rear side window panes across the mid section behind front seats. One version of the embodiment is applicable to two door vehicles with fixed rear side window panes. Another version applicable to four door vehicles does not interfere with opening and closing operations of rear doors.

5 Claims, 1 Drawing Sheet

PARTITION FOR AIR-CONDITIONED VEHICLE

FIELD AND PURPOSE OF THE INVENTION

The present invention discloses an attachable and detachable transparent partition across mid section of the interior of a passenger vehicle to improve the efficiency of temperature control of the driver compartment.

DESCRIPTION OF THE EMBODIMENT AND FUNCTION OF ITS COMPONENTS

Figure 1:
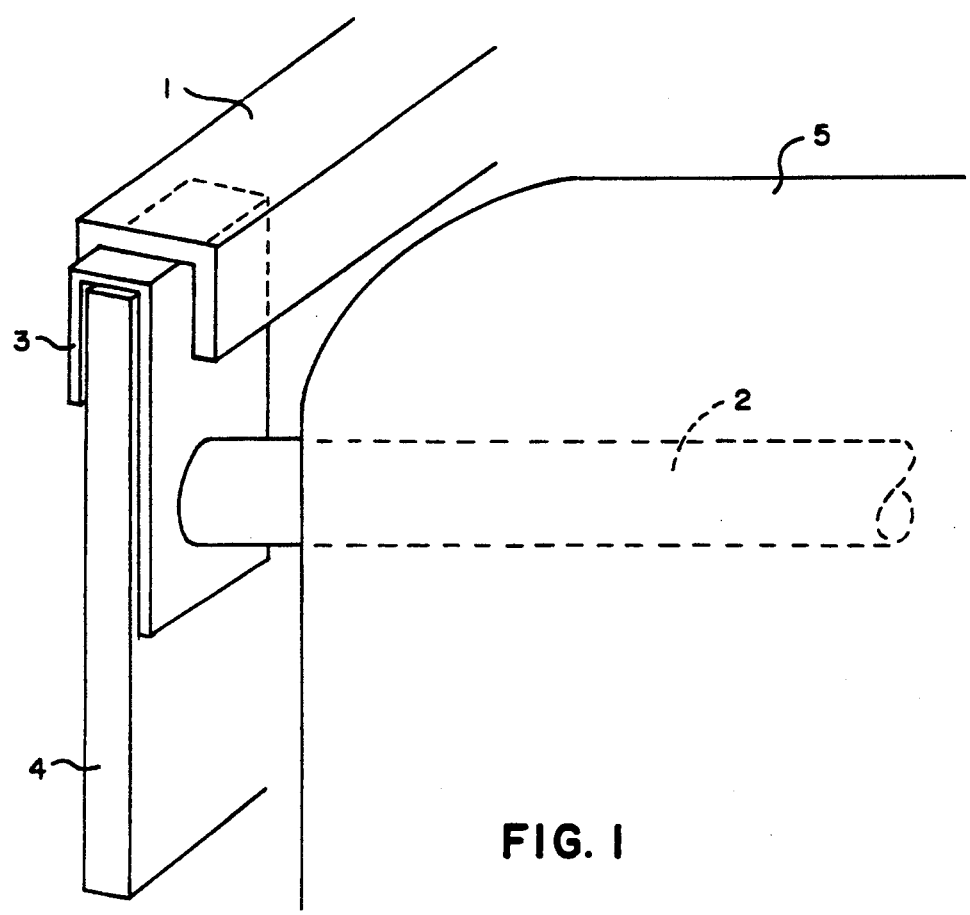
FIG. 1 is a perspective view of a preferred embodiment as applied to a four door vehicle.

Attention is now directed at FIG. 1 which is a perspective view of the embodiment as used in a four door passenger vehicle. 1 represents the upper window frame of rear side door. Each of two ends of an elongated, tensioned, and elastic means 2 is permanently attached to the interior limb of an inverted U-shaped hook 3 snugly fitted over the upper edge of a closable and openable window pane 4 of each of two rear doors. U-shaped hook 3 is made thin enough to allow said hook to fit into the window pane groove of window frame 1. A transparent and flexible curtain 5 fitting the cross-sectional interior dimension of the vehicle behind the front seats is hung on elastic means 2. Said elastic means may be made of a rubber cord or a metallic spring. As constructed and installed, the embodiment allows normal closing and opening operations of rear doors. The rear view is not impaired. The entire embodiment may be dismantled by removing both hooks 3 from window panes 4. This embodiment is also applicable to two door vehicle with openable rear side window panes.

Figure 2:
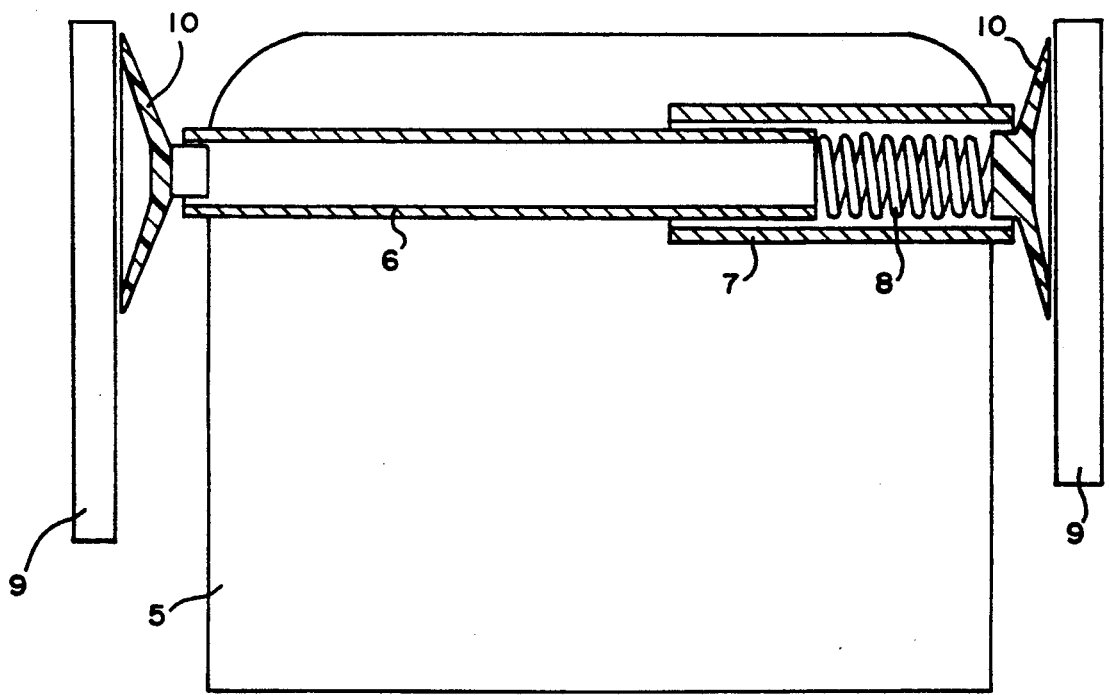
FIG. 2 is a sectional view of a preferred embodiment as applied to a two door vehicle.

FIG. 2 is a sectional view of an alternative embodiment as applied to a two door vehicle with fixed rear side window panes. 6 and 7 represent two elements of a telescoping tubing assembly. A compressable-expandable spring 8 situated loosely within the interior space between 6 and 7 maintains a longitudinally expanding biasing force against the interior surfaces of rear side window panes 9. At each of two ends of the telescoping tubing assembly is mounted permanently a suction cup 10 which is attachably and detachably mounted on the upper interior surface of each of the right and left rear side window panes. A transparent and flexible curtain 5 fitting the cross-sectional interior behind front seats of said vehicle is hung on said telescoping tubing assembly. The entire embodiment may be dismantled by disengaging suction cups 10 from window panes 9.

As in most automotive driving situations, the rear seats are rarely occupied. Thus constructed and appropriately mounted, either of the two embodiments improves the efficiency of temperature control of the driver compartment in: (1) bringing to the desired temperature of the driver compartment faster and earlier and (2) savings in fuel in an air-conditioned vehicle.

It should be understood that this invention and the accompanied claims cover obvious derivatives thereof.

I claim:

1. To achieve more efficient control of interior temperature of the front half of a four door passenger vehicle, an attachable and detachable partition assembly across mid section of interior of said vehicle comprising:

[a] a transparent and flexible curtain fitting said cross mid section behind front seats of said vehicle, said curtain being hung on a elongated, tensioned, and elastic means, and

[b] two inverted U-shaped hooks, one for left one for right, each fitting snugly over respective top edge of closed window pane of openable and closeable windows of right and left rear side doors of said four door vehicle, interior limb of each of said U-shaped hooks being operatively attached to one of two ends of said elastic means.

2. A partition as set forth in claim 1 therein said elastic means being defined as rubber cord.

3. A partition as set forth in claim 1 therein said elastic means being defined as metallic spring.

4. To achieve more efficient control of interior temperature of front half of a two door passenger vehicle, an attachable and detachable partition assembly across mid section of interior of said vehicle comprising a transparent and flexible curtain fitting said mid section behind front seats of said vehicle, said curtain being hung on a longitudinally expandably biased tubing assembly each end of which being permanently mounted onto one of two suction cups, said suction cups being attachably and detachably mounted on interior upper surface of fixed window panes of right and left fixed rear side windows.

5. A partition as set forth in claim 4 therein said tubing assembly being further defined as two telescoping tubings having a compressible and expandable spring in interior space between said two telescoping tubings to maintain longitudinally expandably biasing force on said tubing assembly.

* * * * *